A. A. ENGSTROM.
SAFETY DEVICE FOR CRANKING AUTOMOBILES.
APPLICATION FILED APR. 11, 1911.
1,040,296.
Patented Oct. 8, 1912.
2 SHEETS—SHEET 1.
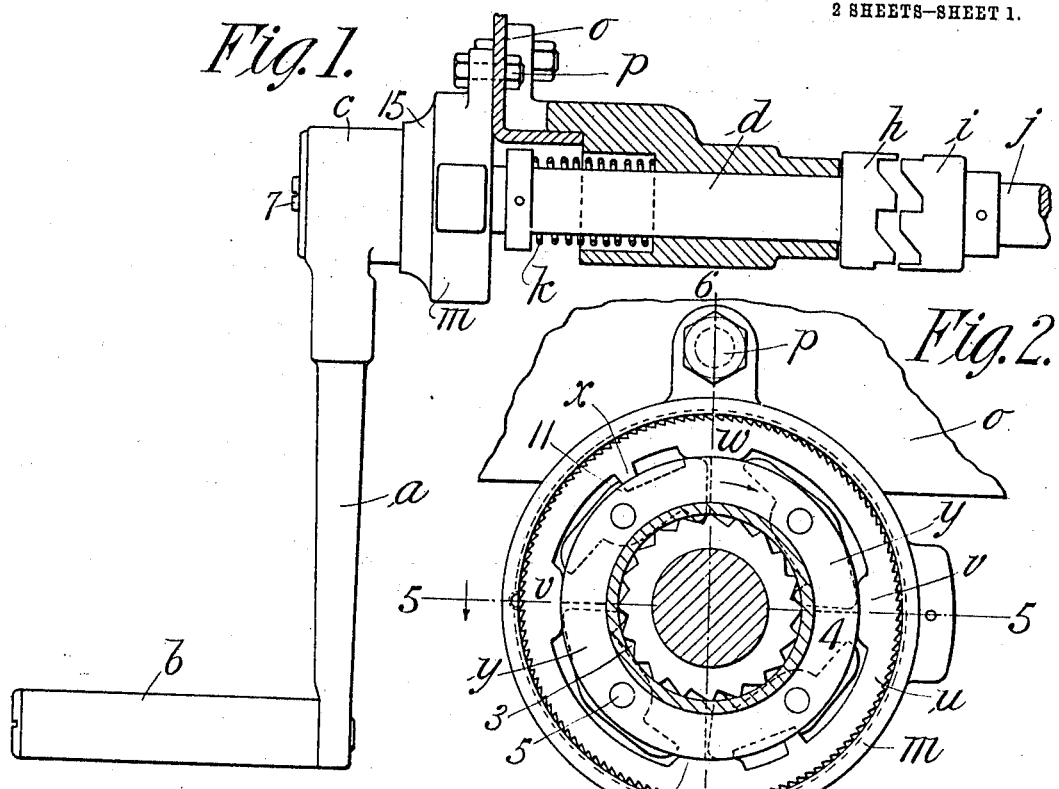
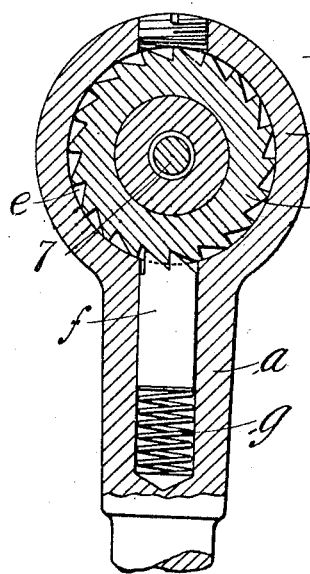
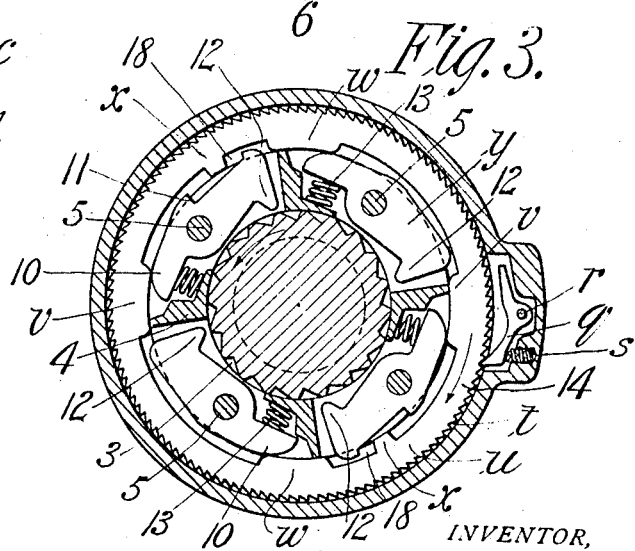
WITNESSES:
H. L. Sprague
Harry W. Bowen.
INVENTOR,
Arthur A. Engstrom,
BY
Chapin & Co.
ATTORNEY.

A. A. ENGSTROM.
SAFETY DEVICE FOR CRANKING AUTOMOBILES.
APPLICATION FILED APR. 11, 1911.
1,040,296.
Patented Oct. 8, 1912.
2 SHEETS—SHEET 2.
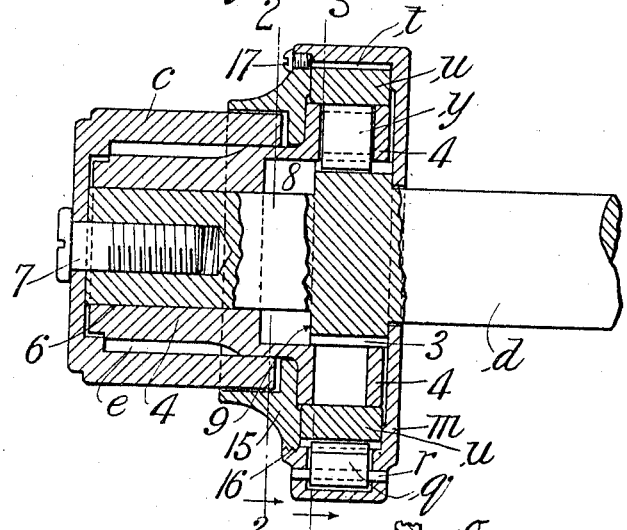
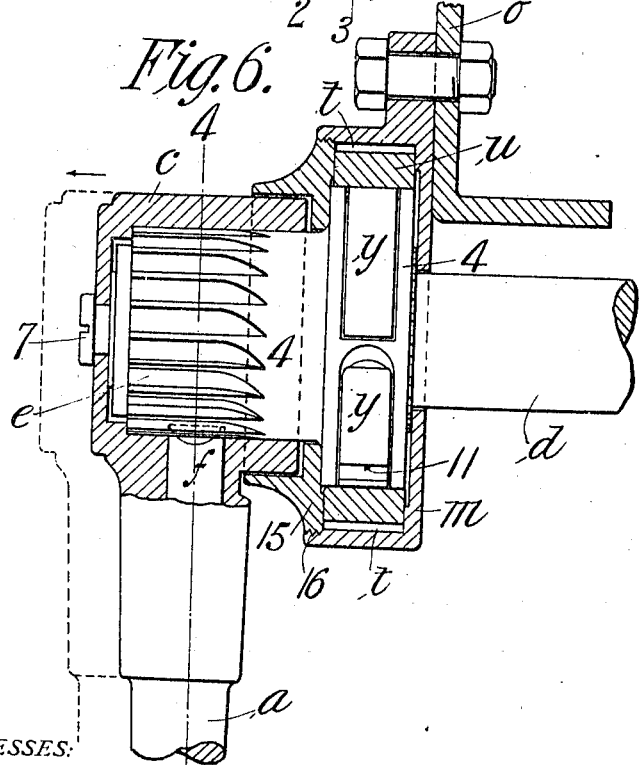
WITNESSES:
H. L. Sprague
Harry W. Bowen.
INVENTOR,
Arthur A. Engstrom,
BY
Chapin & Co.
ATTORNEY.

UNITED STATES PATENT OFFICE.

ARTHUR A. ENGSTROM, OF SPRINGFIELD, MASSACHUSETTS.

SAFETY DEVICE FOR CRANKING AUTOMOBILES.

1,040,296. Specification of Letters Patent. Patented Oct. 8, 1912.

Application filed April 11, 1911. Serial No. 620,451.

*To all whom it may concern:*

Be it known that I, ARTHUR A. ENGSTROM, a citizen of the United States of America, residing at Springfield, in the county of Hampden and State of Massachusetts, have invented new and useful Improvements in Safety Devices for Cranking Automobiles, of which the following is a specification.

This invention relates to improvements in starting devices for internal combustion engines and is particularly designed for starting such engines as used on automobiles.

It sometimes happens, in manually cranking or starting the engine of self-propelled vehicles, that the engine " back fires " or " kicks back ", as it is termed, causing injury to the person operating the starting device.

My invention is designed to overcome this serious objection.

In general, the invention consists in providing a device that will permit the engine to be rotated in its proper or right-hand direction, but will automatically release itself, should the engine suddenly reverse its direction of rotation.

In the drawings forming part of this application,—Figure 1 shows an elevation view, partly in section, of my device. Fig. 2 is a transverse, sectional view on the line 2—2, Fig. 5, showing the locking pawls in operative engagement. Fig. 3 is a similar view on the line 3—3, Fig. 5, showing the pawls disengaged from the shaft. Fig. 4 is a view on the line 4—4 of Fig. 6 illustrating the spring ratchet device for transmitting motion from the crank to the shaft. Fig. 5 is a longitudinal view on the line 5—5 of Fig. 2, and Fig. 6 is a similar view on the line 6—6 of Fig. 2.

Referring to the drawings in detail, $a$ designates a crank provided with an operative handle $b$, the inner end of the crank being provided with an enlarged head portion $c$ which slips over the outer end of a collar element on the shaft $d$ which element is provided with ratchet teeth $e$ that engage the locking pawl $f$ that is normally pressed forward by means of the compression spring $g$. This pawl and ratchet device serves to transmit motion from the crank to the collar element on the shaft when rotated in one direction, and slip idly in the opposite direction.

The inner end of the shaft $d$ is provided with a clutch device $h$ that is adapted to engage a similar clutch device $i$ on the engine shaft $j$. Normally the shaft $d$ is forced outward by means of the spring $k$ so as to disengage the clutches $h$ and $i$. In order to lock the clutches $h$ and $i$ together, the operator pushes inward on the crank $a$ against the tension of the spring $k$ during the starting operations.

Referring now to the detailed construction of the safety device, $m$ designates a casing that is adapted to be secured to the fixed part of the framework, as $o$, by means of a bolt $p$. This casing has mounted within an extended portion thereof a pawl $q$ which is pivoted at the point $r$ and is forced inward by means of the spring $s$ toward the teeth $t$ of a cam-ring $u$, the inner surface of which is provided with cam shoulders $v$ and $w$ and projections $x$, to prevent the pawls $y$ from moving too far or being wedged in the ring $u$. The cam shoulders serve the purpose of camming the locking pawls $y$ into and out of engagement with the teeth 3 on the shaft $d$. Fig. 3 shows these pawls disengaged from the teeth 3 and Fig. 2 shows them in engagement.

The locking pawls $y$ are pivotally mounted in an annular collar member 4, as shown at 5, which collar portion is located within the cam-ring $u$ and it should be noticed that the collar portion is integral with the part in which the ratchet teeth $e$ are cut, and that the shaft $d$ in which the teeth 3 are cut extends through the collar portion to provide a bearing for the end of the shaft $d$ and has endwise movement therein when the clutch members $h$ and $i$ are engaged and disengaged by pushing in on the handle $a$. The outward movement is effected by the spring $k$.

7 designates a screw for loosely and rotatably securing the part c to the shaft d. 8 designates a recess in the collar portion, and 9 a shoulder on the shaft d which moves in the recess 8. This space represents the travel the handle a moves through when the spring h is compressed to effect the locking engagement of the clutch members h and i.

The locking pawls y are provided with cam shoulders 10, and power-transmitting shoulders 11 are formed on two of these pawls which engage the oppositely located projections x. The locking ends of these pawls which engage the teeth 3 of the shaft d are shown at 12, when power is transmitted from the crank a to the shaft d through the collar 4 and pawls y. The locking pawls y are normally pressed inward toward the shaft d by means of the springs 13.

Referring now to the operation of the device, considering the pawls y as being in locking engagement with the teeth 3 of the shaft d, as shown in Fig. 2: Power is transmitted by the operator from the crank a to the collar portion 4 by means of the teeth e, which collar portion carries the pawls y. The shoulders 11 of two of these pawls are in engagement with the oppositely disposed projections x of the cam ring u which rotates this ring and, by reason of the part 12 of the pawls y engaging the teeth 3, the shaft d will be rotated in the direction shown by the arrow 14, at the same time the pawl q that engages the teeth t of the cam ring u, slips idly thereover. Should a back-fire occur in the engine, which of course turns the shaft d in the opposite direction, the ring u will be immediately locked by means of the pawl q, and the pawls y will be cammed out of locking engagement with the teeth 3 by means of the cam-shoulders on the ring u (as shown in Fig. 3) permitting the shaft d to turn idly within its bearings and without injury to the operator.

In order to reëngage the pawls y with the teeth 3, the operator again rotates the crank a forward and, as before, brings the pawls back into the position shown in Fig. 2.

It will be noticed that the rear ends of the pawls engage one set of cams when in locked position with the shaft d, and their forward ends another set when in unlocked position.

15 designates a closing ring that is located between the head c of the crank and the casing m with which it is held in place by the screw-threads 16. This ring is screwed against the cam-ring u with sufficient pressure to prevent this ring turning forward when the operator rotates the crank forward to disengage the pawls y from the inoperative position, as shown in Fig. 3, and allow them to snap down into the teeth 3, as shown in Fig. 2. The cam-ring u then rotates with the pawls. The ring 15 is held in fixed position by means of a screw 17.

From this construction, it will be seen that when the engine back fires that the only movement that can be transmitted to the crank would be that represented by the space 18.

It will be seen that some of the locking pawls y are not provided with transmitting shoulders 11, but that all of the pawls are provided with portions 12 which engage the teeth 3 during the cranking operations.

From the description it will be seen that I have produced a very simple and efficient safety device for starting internal combustion engines without injury to the operator.

What I claim, is:—

1. In a cranking device for internal combustion engines, the combination with a movable cam-ring, the inner surface of which is provided with stop projections and camming surfaces, a series of pawls having shoulders to engage the stop projections, a collar member in which the pawls are mounted, a cranking device proper, a locking engagement between the collar member and the cranking device, a shaft provided with teeth with which the pawls are adapted to engage, means for locking the cam-ring against reverse movement but permitting it to rotate forward in unison with the crank and shaft, whereby when the crank is moved forward the pawls will be thrown into locking engagement with the shaft and will be disengaged therefrom upon the reverse movement of the shaft.

2. In a safety cranking device, a cam-ring, the inner surface of which is provided with cam shoulders and driving projections, a collar having locking pawls mounted therein, some of the pawls having driving shoulders to engage the projections on the cam-ring, and all of the pawls being forced into engagement with the drive-shaft during the cranking operation by the cam shoulders, said drive-shaft having teeth to receive the inwardly projecting ends of the pawls, means to hold the ring against reverse movements should the engine back-fire, and means for transmitting motion to the collar on which the pawls are mounted.

3. A safety cranking device comprising a cam ring member having cam shoulders on its inner surface, a shaft provided with teeth, locking pawls adapted to engage the teeth thereof and operable from said cam shoulders, a recessed collar member for supporting the pawls to move same into and out of engagement with the teeth of the shaft, and a pawl and ratchet device to operate the collar member, said shaft being adapted to move axially in said collar and said recess.

4. A safety cranking device comprising a shaft member, a collar member, means to operate the collar member, a cam-ring, pawls adapted to be operated from the cam-ring and to engage the shaft member for rotating the same, means to frictionally clamp the cam-ring against forward movement when the pawls are disengaged from their inoperative position, and means to prevent said ring from rotating in a reverse direction.

ARTHUR A. ENGSTROM.

Witnesses:
K. I. CLEMONS,
HARRY W. BOWEN.

Copies of this patent may be obtained for five cents each, by addressing the "Commissioner of Patents, Washington, D. C."